(12) United States Patent
Slone

(10) Patent No.: US 8,720,671 B1
(45) Date of Patent: May 13, 2014

(54) CONVEYOR SYSTEM WITH PIVOTAL FLIGHT MEMBERS

(76) Inventor: Brian Slone, Hammond, LA (US)

( * ) Notice: Subject to any disclaimer, the term of this patent is extended or adjusted under 35 U.S.C. 154(b) by 255 days.

(21) Appl. No.: 13/082,523

(22) Filed: Apr. 8, 2011

(51) Int. Cl.
*B65G 15/44* (2006.01)
*B65G 19/26* (2006.01)
*E02B 15/04* (2006.01)

(52) U.S. Cl.
USPC ........ 198/697; 198/732; 210/242.3; 210/776; 210/923

(58) Field of Classification Search
USPC ................. 198/716, 732, 722, 723, 697, 496, 198/803.1, 803.13, 867.1; 210/242.3, 210/242.4, 776, 923, 924
See application file for complete search history.

(56) References Cited

U.S. PATENT DOCUMENTS

| | | | | |
|---|---|---|---|---|
| 1,794,456 A | * | 3/1931 | Hartburg | 198/697 |
| 1,990,554 A | * | 2/1935 | Libberton | 264/345 |
| 2,160,535 A | * | 5/1939 | Briggs | 198/732 |
| 3,146,192 A | | 8/1964 | McCintock | |
| 3,314,540 A | | 4/1967 | Lane | |
| 3,503,489 A | * | 3/1970 | Selis | 198/732 |
| 3,539,013 A | | 11/1970 | Smith | |
| 3,617,555 A | | 11/1971 | Ginsburgh et al. | |
| 3,700,108 A | * | 10/1972 | Richards | 210/242.3 |
| 3,744,638 A | | 7/1973 | Rhodes | |
| 3,822,789 A | | 7/1974 | Crisafulli | |
| 3,876,062 A | * | 4/1975 | Honda | 198/732 |
| 3,968,041 A | | 7/1976 | DeVoss | |
| 4,176,062 A | * | 11/1979 | Husher et al. | 210/776 |
| 4,261,827 A | * | 4/1981 | Bronnec | 210/242.3 |
| 4,264,450 A | | 4/1981 | Ayers et al. | |
| 4,575,426 A | | 3/1986 | Littlejohn et al. | |
| 4,682,684 A | * | 7/1987 | Lothman | 198/459.8 |
| 5,015,378 A | | 5/1991 | Lewan et al. | |
| 5,399,054 A | | 3/1995 | Hines | |
| 5,501,318 A | | 3/1996 | Disrud | |
| 6,328,888 B1 | | 12/2001 | Hines | |
| 6,471,862 B1 | | 10/2002 | Rockwell | |
| 6,695,135 B1 | | 2/2004 | Lapeyre | |
| 7,017,733 B2 | * | 3/2006 | Pfankuch | 198/731 |
| 7,410,577 B2 | | 8/2008 | Broje | |
| 7,537,105 B2 | | 5/2009 | Fourney | |
| 7,775,345 B2 | | 8/2010 | Fourney | |

* cited by examiner

*Primary Examiner* — Gene Crawford
*Assistant Examiner* — Matthew Marotta
(74) *Attorney, Agent, or Firm* — Kenneth L Tolar

(57) ABSTRACT

A conveyor system for transporting material from an origin to a destination includes a conveyor surface that moves a plurality of pivotal flight members along a continuous, predetermined path. The pivotal flight members allow the conveyor surface to freely travel along rollers positioned both within and outside of the conveyor loop for various applications. For example, various obstructions along the predetermined path pivot the flight members in either of two directions to trap, transport and release the material at desired locations. The flight members may be scraped and compressed to remove residual fluids if the conveyor system is used to collect liquids, such as released oil or other contaminants.

13 Claims, 6 Drawing Sheets

CONVEYOR SYSTEM WITH PIVOTAL FLIGHT MEMBERS

CROSS REFERENCE TO RELATED APPLICATIONS

None.

BACKGROUND OF THE INVENTION

The present invention relates to a conveyor system having a plurality of pivotal flight members for more efficiently transporting various materials from an origin to a destination.

DESCRIPTION OF THE PRIOR ART

Conveyors are used in variety of applications to transport materials from one location to another. Conventional flight conveyors typically include a belt with a plurality of fixed, upstanding barriers perpendicularly attached thereto that drag or push the materials along a desired path toward a target destination, and which prevent material from sliding rearwardly on an inclined path. Because the angular orientation of each barrier relative to the underlying portion of the belt remains constant, a substantial amount of material is released from the conveyor during transport. As a result, conventional flight conveyors can be inefficient and ineffective, particularly in certain applications. Furthermore, because the rollers in fixed-flight conveyors cannot engage or encroach the outer surface of the conveyor belt, the flights cannot be scraped, wiped or otherwise cleaned. Therefore, a fixed-flight conveyor belt must always encompass each of the associated rollers, which significantly limits the manner in which the belt is tensioned and guided. For example, the amount of tension applied to a conveyor belt is directly proportional to the degree to which it encompasses the total circumference of a drive roller. Outboard-side rollers can be positioned to redirect the belt to increase the circumferential engagement of the drive roller. However, because conventional flighted conveyors cannot operate with outboard-side rollers, the belt encompasses fifty percent or less of the total circumference of the drive roller, which significantly limits the belt's tensioning capability. Accordingly, there is currently a need for a more efficient conveyor system that overcomes the disadvantages of fixed-flight conveyors.

In addition, oil spills and other pollutant releases can be environmentally and financially catastrophic if the pollutant is not immediately and thoroughly recovered. Gradually, uncollected oil migrates to remote areas, such as shorelines and beaches, causing devastating and sometimes irreparable damage. Once the oil begins to spread, additional equipment and manpower are needed, which increases recovery costs exponentially. Accordingly, an immediate and effective response is critical in order to minimize costs and any eminent environmental damage caused by an oil spill.

Because most oils and other hydrocarbons are lighter than water, they typically float when released. Furthermore, the surface tension created by water's molecular structure causes most hydrocarbons and water to be immiscible in the absence of prolonged agitation or turbulence. Therefore, most oil-recovery devices use skimmers and/or vacuums to remove the floating layer of oil from an underlying layer of water.

Some of these machines are designed to mechanically collect a certain type of oil according to its chemical and physical properties. For example, flight conveyors of the type described above are sometimes used to collect oil or pollutant spills by pushing the material from a contaminated source toward a collection unit. However, because the flights are fixed as described above, the belt cannot be scraped and a significant amount of pollutant is returned to the environment.

Weir skimmers float on the surface of a contaminated body of water with an attached collection tray immersed in the contaminant, but suspended above the underlying water layer. Oil continuously flows into the tray where a pump transfers it to an external reservoir for further treatment or disposal. Likewise, suction skimmers use a vacuum pump to remove fluid from the upper surface of a contaminated water source. However, a weir or a suction skimmer indiscriminately collects any fluid that it contacts, regardless of its physical or chemical properties. Therefore, it often collects a significant amount of water along with the contaminant. Furthermore, weir skimmers are only effective if the water's surface is relatively calm and the oil layer is distinct and concentrated.

Other mechanical skimmers may include a bucket or a similar container that indiscriminately removes fluid from the surface for delivery to a recovery or treatment location. Mechanical recovery methods may be used on a variety of oils regardless of density, viscosity or degree of emulsification; however, they are inefficient and expensive due to the large amounts of water typically collected with the spilled pollutant. Because of governmental regulations and ecological concerns, any entrained water must be separated and further treated prior to returning to the environment. Removing, transporting and treating water are expensive processes and significantly reduce oil-recovery efficiency.

Other mechanical skimmers may use stiff brushes or toothed discs to penetrate and collect clusters of heavier or more-viscous materials, which are transported to a scraper for disposal. Removing adhered oil from the brush bristles or disc teeth is difficult and inefficient. Furthermore, the brushes only collect material by snaring or gripping and are, therefore, ineffective in removing lighter or less-adhesive materials.

In order to reduce the amount of water collected and to more effectively remove lighter materials, some mechanical skimmers include a collection implement, such as a drum, disc or a conveyor, constructed or covered with an oleophilic material that chemically attracts hydrocarbons, but not water. The collection implement is partially submersed, continuously propelled or rotated through the oil to lift the oil from the water and is subsequently scraped or wiped before returning to the oil. However, oleophilic skimmers only remove lighter oils since heavier oils coagulate and overpower the bonding force of the oleophilic material.

Efficient recovery is further complicated by the density, viscosity and other property variations of oils. Furthermore, once released to the environment and exposed to atmospheric conditions, the properties of a given oil can change; for example, lighter compounds gradually evaporate, causing the density and viscosity of the remaining oil to increase. Furthermore, storms, wind, moving vessels and other disturbances can increase turbulence and emulsify the oil, rendering certain types of recovery equipment ineffective. However, since most skimmers are designed to recover oil having certain, predefined characteristics, they may only be effective for a limited interval or only suitable for a particular type of pollutant. Therefore, several skimmers and or vacuum devices may be necessary for a given spill, which is expensive, burdensome and time-consuming. Accordingly, in addition to an improved conveyor system, there is also currently a need for a more versatile oil-recovery device that is capable of collecting a variety of oils, regardless of density, viscosity or concentration.

A review of the prior art reveals a myriad of skimmers, conveyors and oil-collection devices, which are purportedly designed to more efficiently recover released oil. For example, U.S. Pat. No. 6,328,888 relates to a skimmer including a conveyor having a plurality of apertures for collecting material, which is subsequently ejected by a plunger roll.

U.S. Pat. No. 3,968,041 issued to De Voss discloses an oil-collection apparatus including a rotating drum that drives oil onto an inclined conveyor belt for delivery to a waste receptacle.

U.S. Pat. No. 5,399,054 issued to Hines discloses an oil-recovery device including a mesh conveyor that pushes fluid onto a floating vessel.

The prior art is devoid of any devices that overcome the disadvantages of conventional conveyors or which are capable of efficiently collecting a pollutant regardless of its density or viscosity. The present invention overcomes the above-described problems associated with conventional fixed-flight conveyors and oil recovery methods by providing a conveyor system having a plurality of flight members that are pivoted in either of two directions along a conveyor path to trap and release material. In one embodiment, the flight members are oleophilic brushes that chemically attract lighter oils and mechanically trap heavier oils as they are propelled through a pollutant layer. A series of obstructions along the conveyor path pivot the brushes to release heavier material, to scrape lighter material and to strategically orient adhering surfaces at an optimum angle prior to entering the pollutant layer.

SUMMARY OF THE INVENTION

The present invention relates to a conveyor system comprising a conveyor surface that is propelled along a continuous path. The conveyor surface includes a plurality of flight members that are pivoted in either of two directions while traveling along the continuous path to trap and release a desired material. In one embodiment, the flight members include oleophilic fibers that mechanically and chemically remove a pollutant, such as oil. Along the predetermined path is a guide sheet that angularly orients each flight member prior to entering the pollutant to expose a maximum surface area of oleophilic material to the pollutant and to form a scoop for trapping heavier materials on the conveyor surface; the flight member transports the trapped material along an elevated portion of the path until it collides with an engagement plate that inverts the flight member to release trapped material to an underlying collection unit. Subsequently, a wiping blade and a pair of compression drums remove any residual material before the flight member is reoriented by the engagement plate and returns to the pollutant layer.

It is therefore an object of the present invention to provide a conveyor system having flight members that are pivoted in either two directions while traveling along a conveyor path to more effectively trap and release material.

It is another object of the present invention to provide a conveyor system that can recover fluids having varying properties.

It is yet another object of the present invention to provide a conveyor system having pivotal flights that both manually and chemically trap a released pollutant for transport to a collection unit.

It is yet another object of the present invention to provide a conveyor system having flight members that are pivotal in either of two directions relative to a conveyor surface.

It is yet another object of the present invention to provide a conveyor system having pivotal flight members that allow conveyor rollers to be positioned on both the inboard and outboard sides of a conveyor belt to manipulate the flight members along the conveyor path.

It is yet another object of the present invention to provide a conveyor having pivotal flight members that allow conveyor rollers to be positioned on both the inboard and outboard sides of a conveyor belt to broaden certain design options for a given application.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
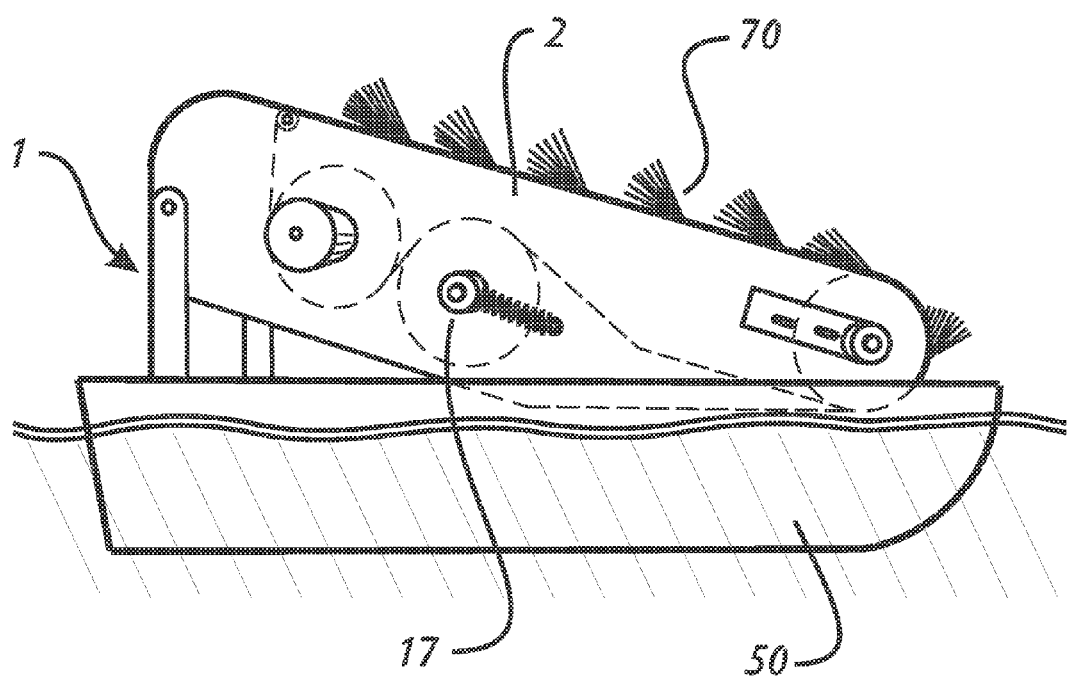
FIG. 1 is a perspective view of the conveyor system according to the present invention mounted on a vessel.
Figure 2:
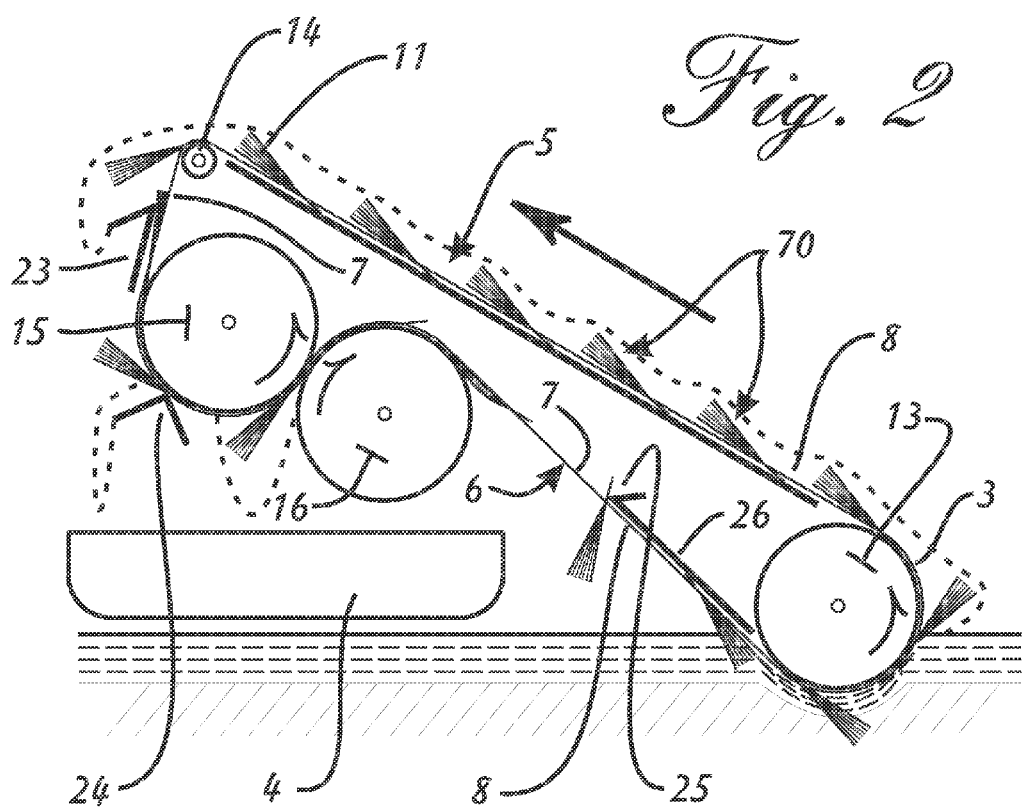
FIG. 2 is an isolated view of the conveyor system of FIG. 1.

The present invention relates to a conveyor system comprising a support structure 1, such as a housing or frame, having at least two opposing, spaced sidewalls 2. The support structure may be disposed within a floating vessel 50 or any other similar device that positions the conveyor near material to be transported. Furthermore, the support structure or conveyor may be pivotally mounted or vertically adjustable to control the degree of contact with the intended material. Between the sidewalls is a continuous belt or similar conveyor surface 3 that moves along a continuous path between various zones where material is first collected and later transported to a collection unit 4; the belt includes a top segment 5, a bottom segment 6, an inboard side 7, and an outboard side 8 with a plurality of spaced flight members 70 pivotally mounted thereon.

Each flight member is formed of a somewhat rigid but flexible material that allows a portion of the flight member to pass between the belt and conveyor rollers for the reasons described in more detail, supra. For example, the flight member can be a planar panel constructed of absorbent sponge, webbing or any similar material depending upon a particular application or material to be transported. When pivoted at predetermined locations along the conveyor path, the flight members trap, transport and subsequently release a desired substance or object; accordingly, the conveyor system according to the present invention could be used in virtually any application where collecting and transporting items from one location to another is desired.

Each flight includes a base flap 10 depending from the inboard side of the conveyor and a collection section 11 extending from the outboard side of the conveyor surface. Accordingly, displacement of the base section in a first direction pivots the collection section 11 in an opposite direction. When the flights engage a series of obstructions along the conveyor path, they are pivoted in both of the two directions to trap and release material at desired locations.

The conveyor surface includes a series of spaced pockets that each receive the base flap of one of the flight members.

Accordingly, each flap and surrounding pocket protrudes from the inboard side of the belt while the collection section extends from the outboard side allowing the flight member to pivot in either of two directions.

In the preferred embodiment, the pockets are formed by folding a section of the belt downwardly and then upwardly to form a U-shaped indention 40; the flap is inserted into the indention and is securely fastened to the belt with stitching, adhesives or similar means. As will be readily apparent to those skilled in the art, other mechanisms, such as hinges or similar means, may also be used to pivotally mount each flight member relative to an underlying segment of the conveyor surface.

One embodiment of the conveyor system according to the present invention is particularly designed to remove oil or similar pollutants. The collection section of each flight member is formed of a plurality of elongated, bundled fibers 110, absorbent webbing, sponge 100, a pliable panel 101 or any other material that can absorb, attract or otherwise collect the released pollutant. The fibers could be constructed or coated with an oleophilic material having an acute chemical attraction for oil and other hydrocarbons, as opposed to water. As such, when the fibers contact an oil/water mixture, oil will tend to adhere to the fibers while water will remain. The fibers may be rigid to penetrate and grip heavier oils, more flexible to attract lighter oils or a combination of the two to collect both, if necessary.

Figure 3:
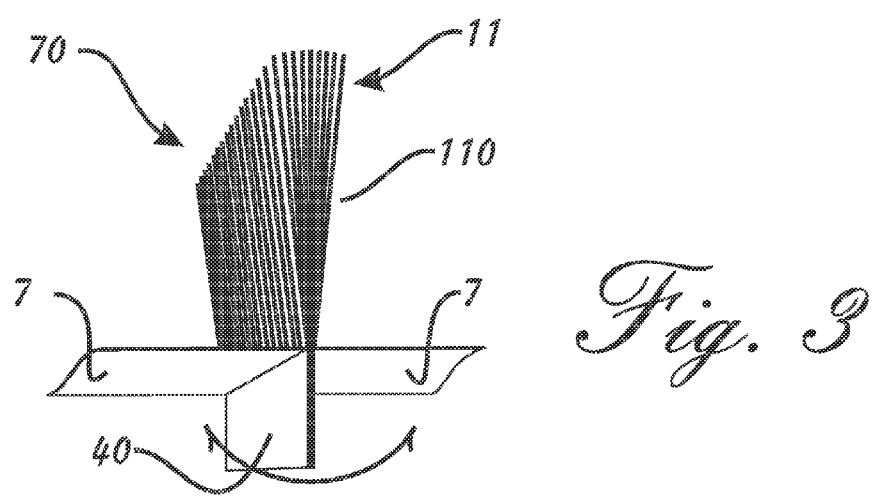
FIGS. 3-5 are isolated views of exemplary flight members.
Figure 4:
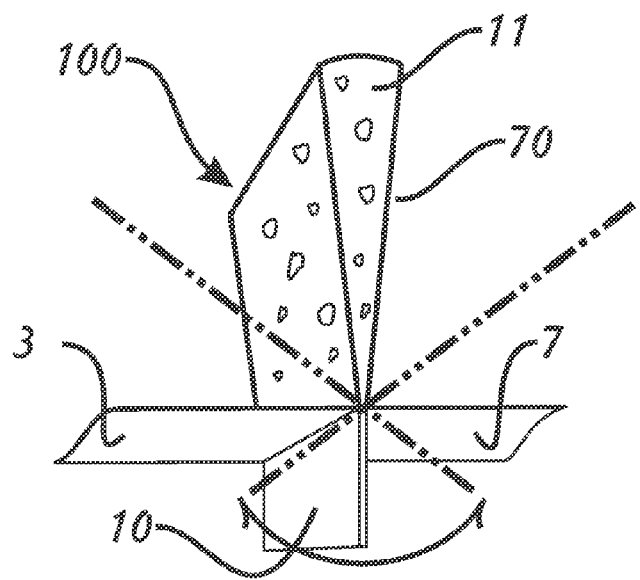
Figure 5:
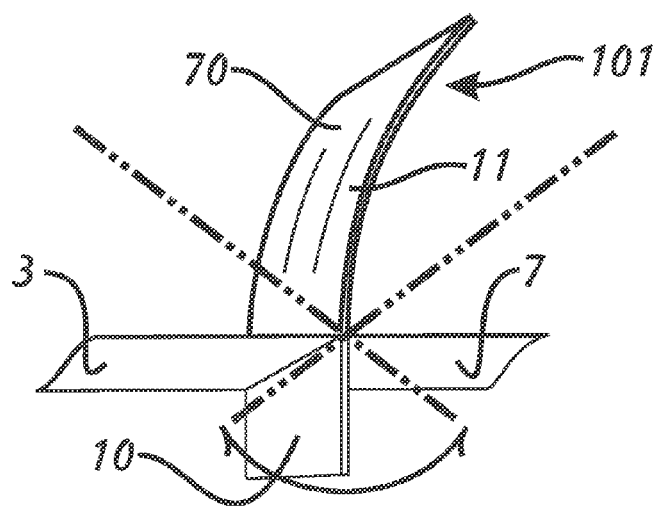
Figure 6:
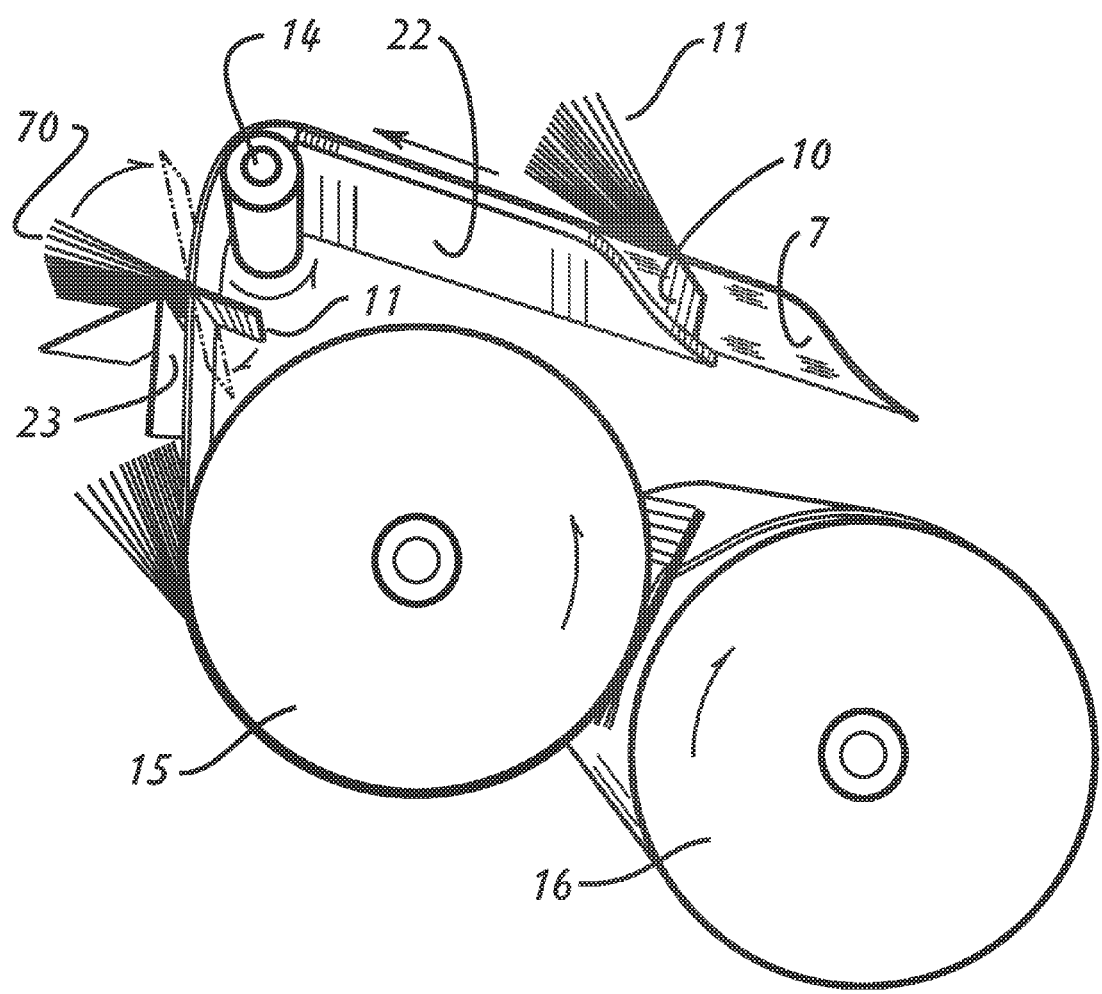
FIG. 6 is a sectional view of the conveyor system depicting the discharge zone.
Figure 7:
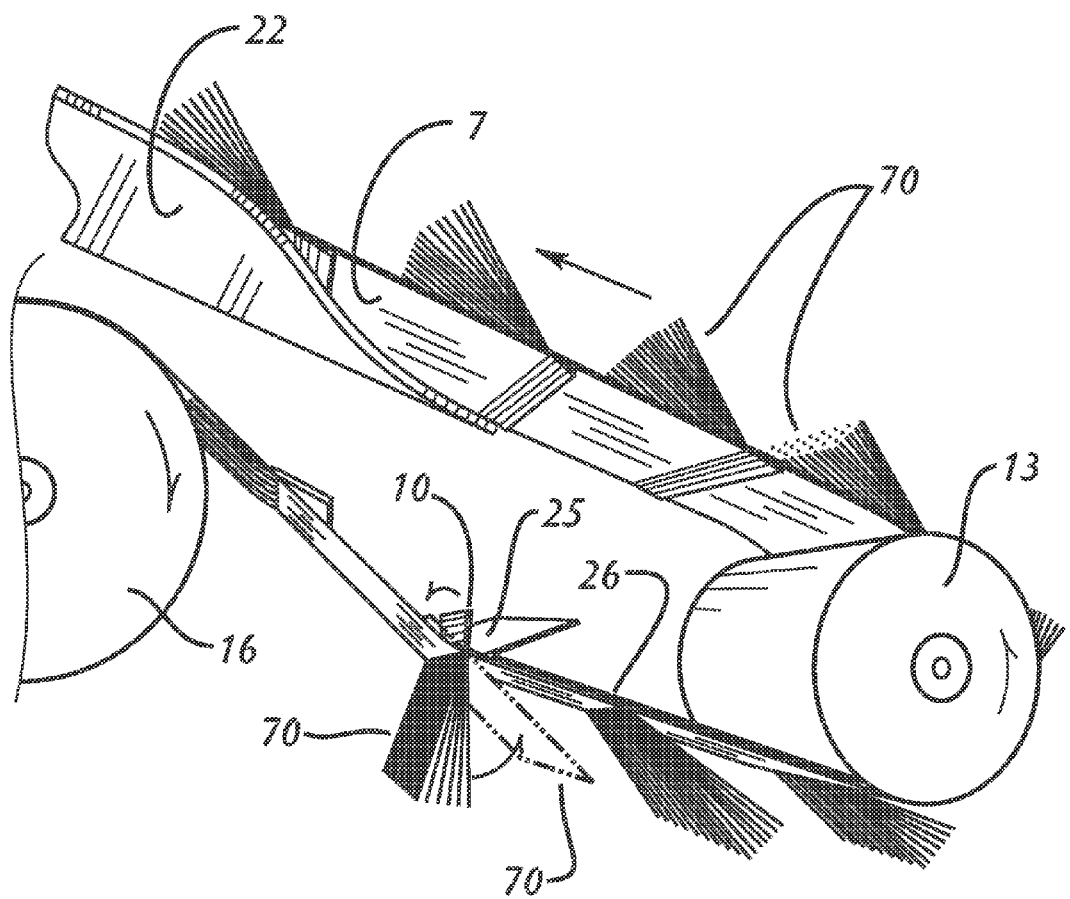
FIG. 7 is a sectional view of the conveyor system depicting the return and collection zones.

The belt encompasses a lower roller 13 and an upper idler 14 roller having a smaller diameter than the upper roller. In this particular embodiment, the upper and lower rollers are positioned to move the top segment of the belt upwardly along an inclined path as depicted in FIGS. 1 and 3. Below the upper roller are first 15 and second 16 contiguous compression drums, between which the belt travels along its continuous path. At least one of either the lower roller or the compression drums is operably connected to a drive means (i.e., a motor) that propels the conveyor surface along the continuous path. One of the compression drums may include a spring-biased axle 17 that rides within a slot on the support structure sidewall for adjusting the pressure between the two compression drums.

Figure 8:
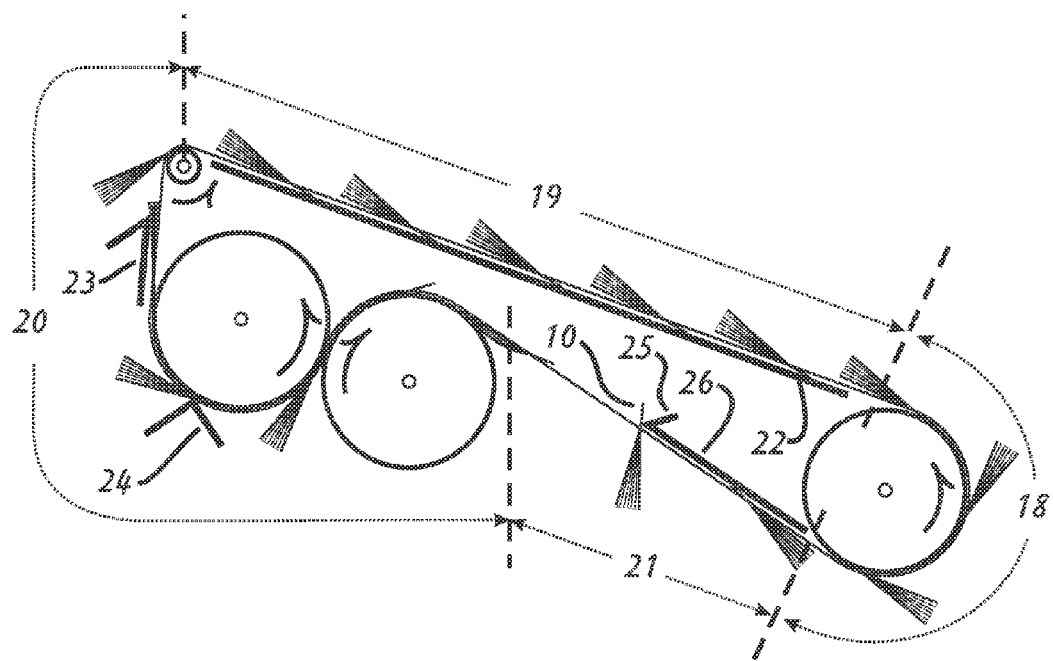
FIG. 8 is an isolated view of the conveyor system depicting the various zones.

As illustrated in FIG. 8, the belt path includes a retrieval zone 18, a transport zone 19, a discharge zone 20 and a return zone 21. The retrieval zone is defined by the section of the belt that engages the circumference of the lower roller. The transport zone is defined by the top segment of the belt that extends from the lower roller to the upper roller. Within the transport zone, the belt rides on a planar stiffener 22 that provides structural integrity as the belt transports collected material to the discharge zone, and which maintains each flight member in a desired orientation.

The discharge zone is the area between the upper roller and the upper periphery of the second compression drum. Immediately past the upper roller is an engagement plate 23 that inverts each flight member to release material trapped between it and the conveyor surface. Further along the path is a wiping blade 24 that scrapes each passing flight member to remove adhered material, and properly orients each base flap prior to engaging the first compression drum 15. Each flight member is then firmly compacted between the compression drums to remove any remaining residual fluid. The collection unit is disposed immediately beneath the discharge zone for receiving any material dislodged by the engagement plate, the wiping blade and compression drums. The collection unit may be a vat, a pan, a floating vessel, a tank or any other device capable of receiving and containing fluid.

The return zone extends from the terminus of the discharge zone to the starting point of the retrieval zone. Within the return zone is an angular baffle 25 having a guide sheet 26 extending therefrom that is parallel to and minimally spaced from the inboard side of the conveyor surface; the baffle 25 engages the base flap of each flight member to pivot the collection section toward the retrieval zone; therefore, the collection section enters the fluid surface at an optimal, oblique angle to expose a maximum surface area of the oleophilic material to the pollutant, as opposed to approaching in a vertical or horizontal position. Furthermore, when the flight member is at an acute angle relative to the belt, it forms a scoop for trapping and transporting heavier material. As each flap is compressed between the belt and the lower roller, the collection surface's grip on the trapped material tightens until the flight member reenters the transport zone.

To recover a floating layer of pollutant from an underlying liquid layer, a user adjusts the elevation of lower roller to a desired penetration depth within the pollutant. The conveyor drive means is activated to propel the conveyor belt and pivotal flight members along the predetermined path. As each flight member enters the fluid, the pollutant will naturally adhere to the oleophilic material. Furthermore, additional fluid, particularly heavier material, will be trapped on the belt while the flight member moves upwardly through the transport zone. Once the flight member passes the upper roller, it is inverted by the engagement plate to deposit any trapped material into the collection unit. The flight member then engages the scraping blade, which removes much of any entrained material. The compression drums then squeeze the flight member to release any remaining absorbed material. When the flight member enters the return zone, the baffle and guide sheet reposition the collection surface at the optimum angle relative to the fluid layer as described above.

The above-described device is not limited to the exact details of construction and enumeration of parts provided herein. For example, though the device has been thoroughly depicted and described as an oil skimmer, it can be readily used to remove and transport virtually any materials or items. In addition, the number, size, positioning and shape of the conveyor rollers, the type of conveyor surface and the size, shape and materials of construction of the flight members can be varied to suit a particular application.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A conveyor system for transporting material from one location to another comprising:
   a continuous conveyor surface having an inboard side and an outboard side;
   a drive means for propelling said conveyor surface along a predetermined, continuous path;
   a plurality of flight members pivotally mounted on the outboard side of said conveyor surface, each of said flight members having a front surface, a rear surface and an upper end;
   means for pivoting said flight members between a forward position and an inverted rearward position, when in said forward position, the front surface of each of said flight members resting on said conveyor surface, when in a the rearward position, the rear surface of each of said flight members resting on said conveyor surface.

2. The conveyor system according to claim 1 wherein the upper end of each of said flight members is substantially facing a transport direction when in said forward position, and the upper end of each of said flight members is substantially facing a direction opposite the transport direction when in said rearward position.

3. The conveyor system according to claim 1 wherein each of said flight members is formed of a rigid but flexible material so that each of said flight members is compressible by an object immediately adjacent to the outboard side of said conveyor surface to remove adherent residual material.

4. The conveyor system according to claim 1 wherein each of said flight members is formed of a plurality of bundled fibers constructed with an material.

5. The conveyor system according to claim 1 wherein each of said flight members includes a base flap protruding from the inboard side of said conveyor surface whereby movement of said flap in a first direction pivots said upper end in an opposite direction.

6. The conveyor system according to claim 5 wherein said conveyor surface includes a series of spaced pockets that each receive the base flap of one of said flight members, wherein said pockets are defined by a U-shaped fold formed on said conveyor surface.

7. The conveyor system according to claim 1 wherein said means for pivoting said flight members between a forward position and an inverted rearward position comprises a plurality of obstructions positioned along said path that inverts each of said flight members when each of said flight members collides therewith, wherein one of said obstructions is an engagement plate positioned immediately adjacent the outboard side of said conveyor surface that thrusts the upper end of each of said flight members rearwardly relative to the transport direction of said conveyor surface to release material trapped therebetween.

8. The conveyor system according to claim 7 wherein one of said obstructions further comprises a guide sheet positioned immediately adjacent to the inboard side of said conveyor surface that thrusts the upper end of each of said flight members forward relative to a transport direction of said conveyor surface to trap material therebetween and to angularly orient said flight member relative to the material.

9. The conveyor system according to claim 3 wherein said conveyor surface passes between a first drum that engages the outboard side of said conveyor surface, and a second drum that engages the inboard side of said conveyor surface, said first drum and said second drum tightly compacting each of said flight members to release material adhering thereto.

10. The conveyor system according to claim 8 wherein one of said obstructions further comprises a wiping blade positioned along said path adjacent to the outboard side of said conveyor surface for scraping each of said flight members to remove adhered material.

11. The conveyor system according to claim 3 wherein said conveyor surface includes an upwardly-inclined portion to transport trapped material to an elevated dispensing zone for release into an underlying collection unit.

12. The conveyor system according to claim 5 further comprising a stiffener adjacent the inboard side of said conveyor surface which pivots said base flap rearwardly relative to a transport direction to maintain each of said flight members in a desired angular orientation while moving along said path.

13. The conveyor system according to claim 9 wherein either of said first compression drum and said second compression drum includes a spring-biased axle that adjustably rides within a slot on an adjacent support structure for adjusting a pressure applied to said flight members as said flight members pass between the first compression drum and the second compression drum.

\* \* \* \* \*